United States Patent
Izumi

(10) Patent No.: US 8,538,268 B2
(45) Date of Patent: Sep. 17, 2013

(54) OPTICAL SIGNAL DEMULTIPLEXING DEVICE AND OPTICAL SIGNAL DEMULTIPLEXING METHOD

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 47 days.

(21) Appl. No.: 13/298,911

(22) Filed: Nov. 17, 2011

(65) Prior Publication Data
US 2012/0063784 A1 Mar. 15, 2012

Related U.S. Application Data

(60) Division of application No. 12/213,838, filed on Jun. 25, 2008, now abandoned, which is a continuation of application No. PCT/JP2005/017780, filed on Sep. 27, 2005.

(51) Int. Cl.
*H04J 14/08* (2006.01)
*H04J 14/00* (2006.01)

(52) U.S. Cl.
USPC ............................................. 398/101; 398/47

(58) Field of Classification Search
USPC ...................................................... 398/47, 98
See application file for complete search history.

(56) References Cited

U.S. PATENT DOCUMENTS

| 2001/0017720 A1 | 8/2001 | Hait | |
| 2001/0053012 A1* | 12/2001 | Shikata | 359/184 |
| 2004/0165816 A1* | 8/2004 | Oikawa et al. | 385/17 |

FOREIGN PATENT DOCUMENTS

| JP | 7-131441 | 5/1995 |
| JP | 7-221708 | 8/1995 |
| JP | 8-304865 | 11/1996 |
| JP | 9-181380 | 7/1997 |
| JP | 11-239116 | 8/1999 |

OTHER PUBLICATIONS

"Introduction to DWDM Technology" by S. Kartalopoulos, SPIE, 2000, pp. 91-94.*
International Search Report for PCT/JP2005/017780, mailed Dec. 20, 2005.
US Office Action for related U.S. Appl. No. 12/213,838, mailed on May 16, 2011.
US Office Action for related U.S. Appl. No. 12/213,838, mailed on Oct. 18, 2011.

* cited by examiner

*Primary Examiner* — Shi K Li
(74) *Attorney, Agent, or Firm* — Staas & Halsey LLP

(57) ABSTRACT

An optical signal demultiplexing device includes a demultiplexing unit that receives an optical signal multiplexed by an optical time-division system and a synchronization pattern, and demultiplexes the optical signal based on the synchronization pattern. The optical signal demultiplexing device also includes a pulse-width increasing unit that makes optical signals demultiplexed by the demultiplexing unit generate chirp, and increases the pulse widths of the optical signals generating the chirp by passing the optical signals through a wavelength dispersion medium.

6 Claims, 15 Drawing Sheets

FIG.16

OPTICAL SIGNAL DEMULTIPLEXING DEVICE AND OPTICAL SIGNAL DEMULTIPLEXING METHOD

This application is a divisional of U.S. patent application Ser. No. 12/213,838, filed Jun. 25, 2008 now abandoned, which was a continuing application filed under 35 U.S.C. §111(a) of PCT International Application Number PCT/JP2005/017780 filed Sep. 27, 2005, the contents of which are incorporated herein by reference.

BACKGROUND OF THE INVENTION

1. Field of the Invention

The present invention relates to an optical signal demultiplexing device that multiply demultiplexes an optical signal multiplexed by an optical time-division system.

2. Description of the Related Art

In recent years, in an optical fiber communication system, OTDM (Optical Time Division Multiplex) for time-division multiplexing optical signals directly in the state of light is being studied. According to this OTDM, when multiplexing optical signals, the optical signals are multiplexed at a timing assigned beforehand. When demultiplexing the multiplexed optical signal, multiplexed light is demultiplexed at a timing assigned beforehand. By multiplexing and demultiplexing the optical signals directly in the state of light by using the OTDM, a large capacitance of an efficient and economic network can be achieved.

Japanese Patent Application Laid-open No. H7-221708 discloses a technique of compensating for a delay of an optical signal generated by an optical path difference within a node, using dispersion dependency of an optical fiber on a wavelength, when the optical signal passes within each node that constitutes an optical fiber communication system, thereby achieving a precise synchronization of the optical signal concerning the optical fiber communication system.

However, according to the conventional technique described above, because the optical signal of each channel needs to be multiplexed and demultiplexed at a specified timing in the OTDM, there has been a problem in that high-level process cannot be performed in the state of the optical signal (for example, according to the conventional technique, only a path change can be performed in the state of the optical signal).

To progress the use of light in the network, the cost of processing an optical signal directly in the state of light needs to be lower than the cost of converting an optical signal into an electric signal. At the same time, the process of the optical signal in the state of light needs to be diverse like the process of the electric signal. That is, in processing light directly in the state of light, when only the path can be changed, it is considered unlikely that the use of optical signals in the network becomes popular by replacing the electric signals that can be flexibly processed.

In other words, when the optical signal is processed directly in the state of light, it is considerably important that light can achieve high-level process that the electric signal can achieve.

SUMMARY OF THE INVENTION

It is an object of the present invention to at least partially solve the problems in the conventional technology.

According to an aspect of the present invention, an optical signal demultiplexing device includes a demultiplexing unit that receives an optical signal multiplexed by an optical time-division system and a synchronization pattern, and demultiplexes the optical signal based on the synchronization pattern; and a pulse-width increasing unit that makes optical signals demultiplexed by the demultiplexing unit generate chirp, and increases the pulse widths of the optical signals generating the chirp by passing the optical signals through a wavelength dispersion medium.

According to another aspect of the present invention, an optical signal demultiplexing method includes receiving an optical signal multiplexed by an optical time-division system and a synchronization pattern, and demultiplexing the optical signal based on the synchronization pattern; making the demultiplexed optical signals generate chirp; and increasing the pulse widths of the optical signals generating the chirp by passing the optical signals through a wavelength dispersion medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a time chart concerning an optical signal that the optical demultiplexing device shown in FIG. 14 receives;

DETAILED DESCRIPTION OF THE PREFERRED EMBODIMENTS

Exemplary embodiments of an optical signal demultiplexing device according to the present invention will be explained below in detail with reference to the accompanying drawings. Note that the invention is not limited to the embodiments.

Figure 17:
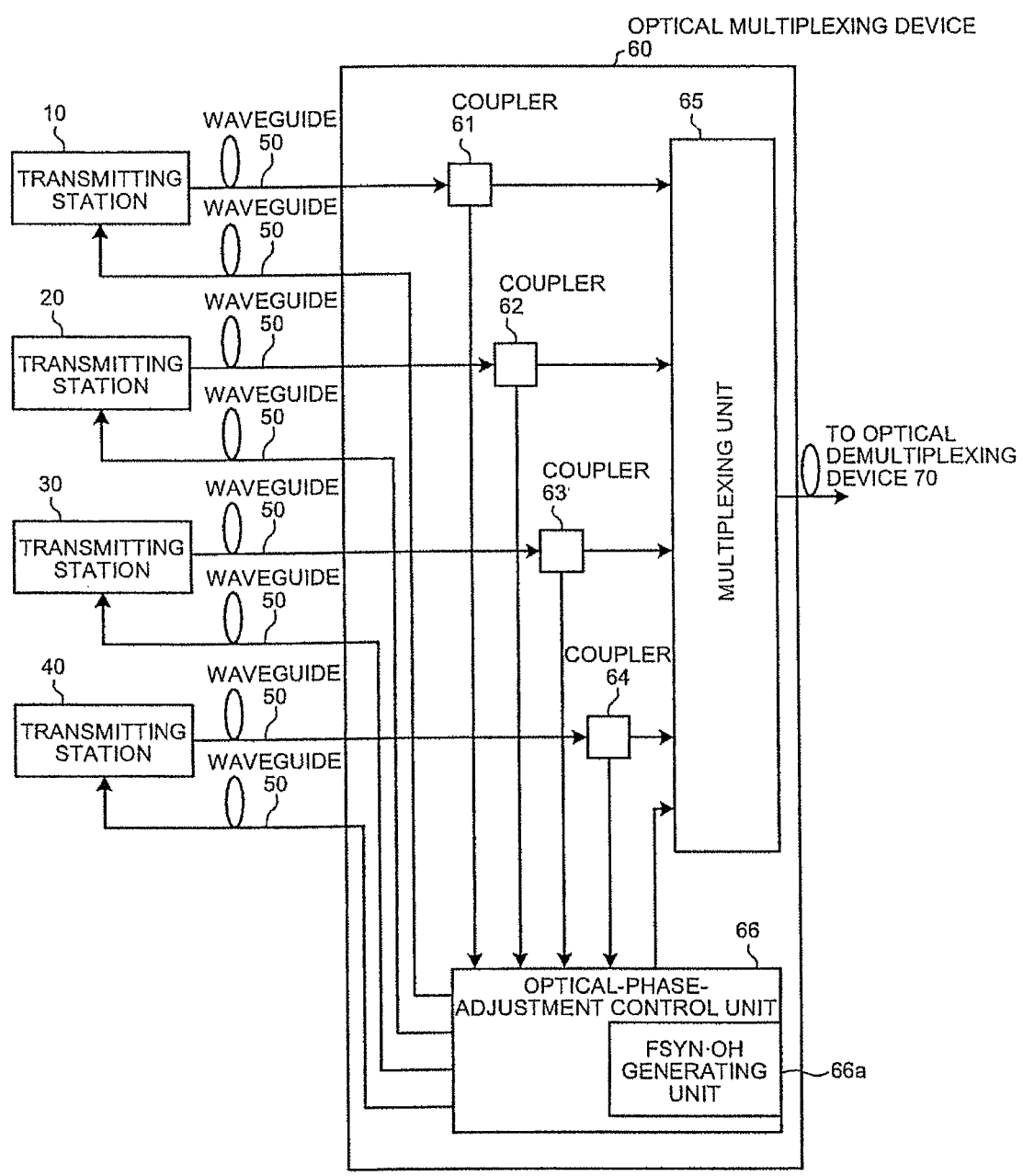
FIG. 17 is an explanatory diagram (1) for explaining a conventional OTDM (Optical Time Division Multiplex) system.
Figure 18:
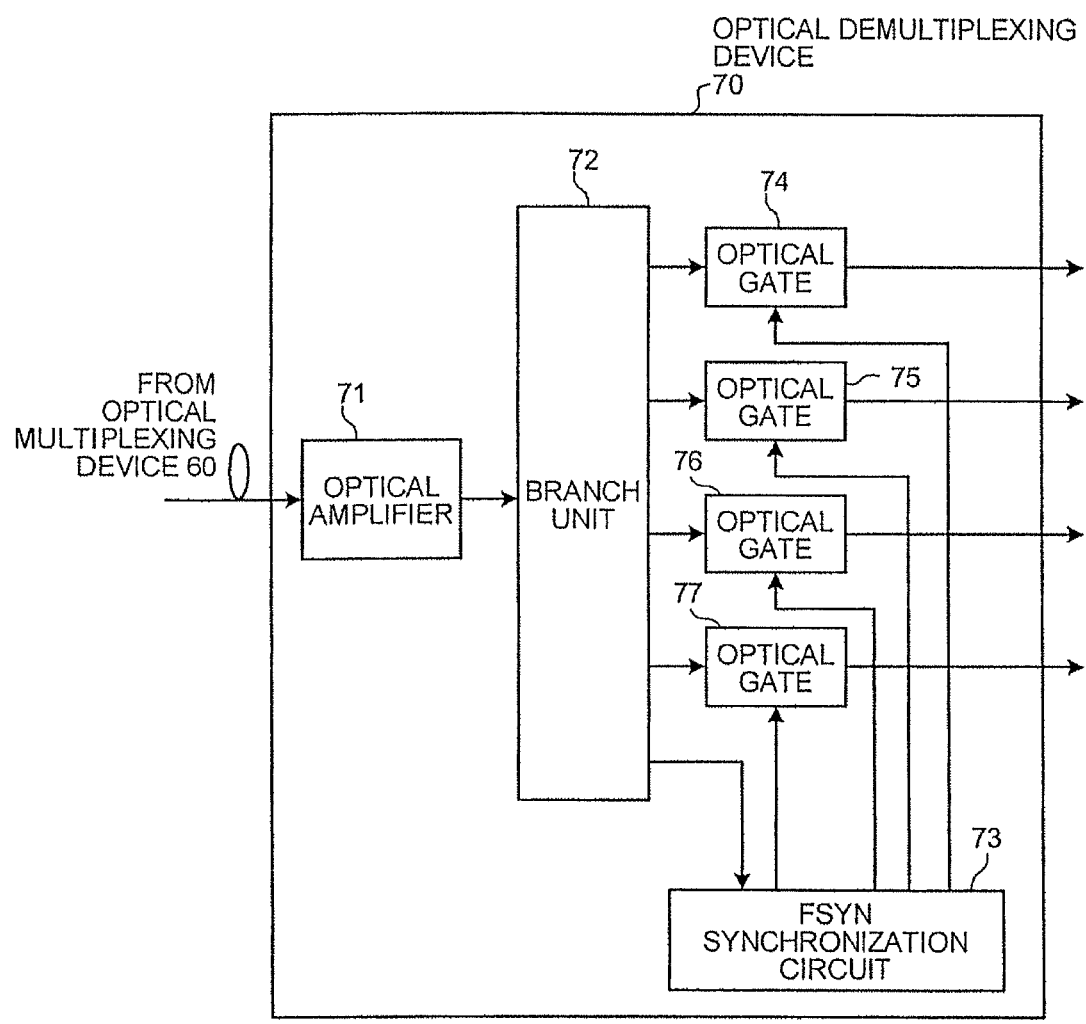
FIG. 18 is an explanatory diagram (2) for explaining a conventional OTDM (Optical Time Division Multiplex) system.

First, characteristics of the present invention are explained with reference to those of a conventional technique. FIG. 17 and FIG. 18 are explanatory diagrams for explaining the conventional OTDM (Optical Time Division Multiplex) system. FIG. 17 is an example that an optical multiplexing device 60 multiplexes (time-division multiplexes) optical signals transmitted from transmitting stations 10 to 40. The transmitting stations 10 to 40 and the optical multiplexing device 60 are connected to each other via waveguides 50. A representative example of the waveguide 50 is an optical fiber.

The optical multiplexing device 60 includes couplers 61 to 64, a multiplexing unit 65, and an optical-phase-adjustment control unit 66. The couplers 61 to 64 are devices that branch an optical input signal into two or more outputs. For example, the coupler 61 branches an optical signal input from the transmitting station 10 into two optical signals, inputs one of the optical signals to the multiplexing unit 65, and inputs the other optical signal to the optical-phase-adjustment control unit 66. The multiplexing unit 65 is a processing unit that combines (time-division multiplexes) the optical signals input from the couplers 61 to 54 with an optical signal input from an FSYN.OH generating unit 66a, and transmits the combined optical signal to an optical demultiplexing device 70 shown in FIG. 18.

The optical-phase-adjustment control unit 66 is a processing unit that monitors phases of the optical signals input from the transmitting stations 10 to 40, and remote controls the phases of the optical signals transmitted from the transmitting stations 10 to 40. In FIG. 17, the waveguides 50 connect between the optical-phase-adjustment control unit 66 and the transmitting stations 10 to 40, for the optical-phase-adjustment control unit 66 to control the transmitting stations 10 to 40 (as indicated by arrowheads directed from the optical-phase-adjustment control unit 66 to the transmitting stations 10 to 40). Alternately, this connection can be performed using electric signals. The optical-phase-adjustment control unit 66 also has the FSYN.OH generating unit 66a. The FSYN.OH generating unit 66a is a processing unit that generates data (hereinafter, described as overhead data) such as a synchronization fixed pattern, monitoring-signal line data, and order wire data, and inputs the generated overhead data to the multiplexing unit 65. The overhead data input to the multiplexing unit 65 is combined with other optical signals, and the combined data is transmitted to the optical demultiplexing device 70 shown in FIG. 18. The overhead data is also used to transfer a communication alarm.

FIG. 18 is an example that the optical demultiplexing device 70 demultiplexes an optical signal multiplexed by the optical multiplexing device 60. The optical demultiplexing device 70 includes an optical amplifier 71, a branch unit 72, an FSYN synchronization circuit 73, and optical gates 74 to 77. The optical amplifier 71 is a processing unit that amplifies an input optical signal, and delivers the amplified optical signal to the branch unit 72.

The branch unit 72 is a processing unit that branches the input optical signal into plural optical signals. The branch unit 72 shown in FIG. 18 branches the optical signal input from the optical amplifier 71 into five optical signals, and inputs the branched optical signals to the FSYN synchronization circuit 73, and the optical gates 74 to 77.

The FSYN synchronization circuit 73 is a device that extracts overhead data contained in the optical signal obtained from the branch unit 72, and changes over between the optical gates 74 following the synchronization fixed pattern contained in the overhead data. Based on the change over control performed by the FSYN synchronization circuit 73, the optical gates 74 to 77 can demultiplex the optical signals multiplexed by the optical multiplexing device 60 shown in FIG. 17.

Figure 1:
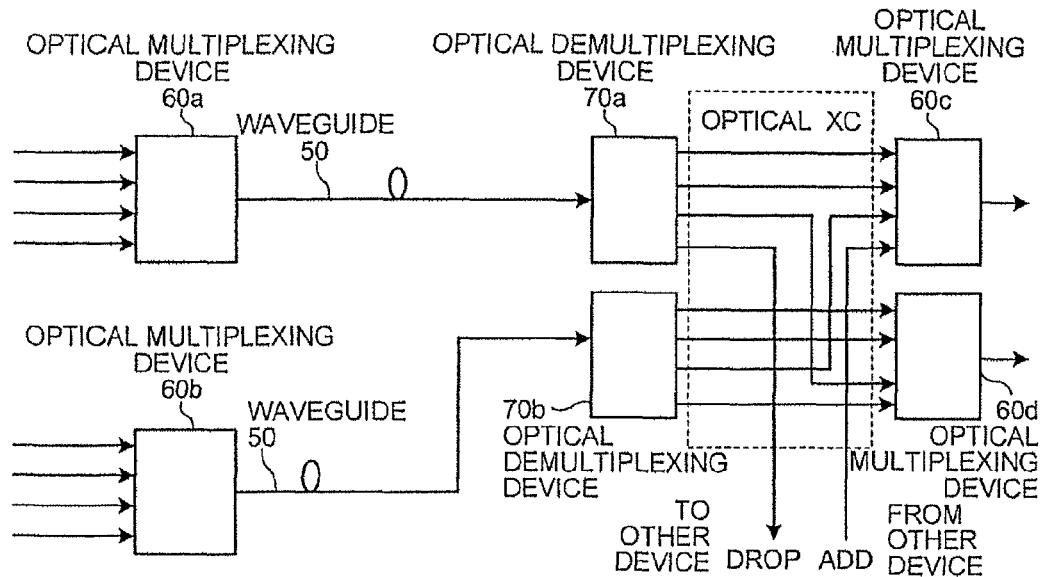
FIG. 1 is an explanatory diagram for explaining a network configuration of an OTDM which a conventional optical multiplexing device and a conventional optical demultiplexing device cannot achieve.

However, the conventional optical multiplexing device 60 and the conventional optical demultiplexing device 70 shown in FIG. 17 and FIG. 18 cannot achieve a network configuration by the OTDM as shown in FIG. 1. FIG. 1 is an explanatory diagram for explaining the network configuration of the OTDM that the conventional optical multiplexing device and the conventional optical demultiplexing device cannot achieve.

According to the network configuration shown in FIG. 1, an optical signal multiplexed by an optical multiplexing device 60a is input to an optical demultiplexing device 70a, and an optical signal multiplexed by an optical multiplexing device 60b is input to an optical demultiplexing device 70b. The optical demultiplexing device 70a demultiplexes the input optical signal, and inputs the demultiplexed optical signals to optical multiplexing devices 60c and 60d. The optical demultiplexing device 70b demultiplexes the input optical signal, and inputs the demultiplexed optical signals to the optical multiplexing devices 60c and 60d.

The optical multiplexing devices 60c and 60d cannot OTDM multiplex again the optical signals obtained from the optical demultiplexing devices 70a and 70b (or other devices), in the state of light. This is because the timing concerning multiplexing and demultiplexing by the optical multiplexing device 60a and the optical demultiplexing device 70a is different from the timing concerning multiplexing and demultiplexing by the optical multiplexing device 60b and the optical demultiplexing device 70b. Consequently, each timing of each optical signal cannot be adjusted at the optical level.

In the present invention, the optical demultiplexing device includes a system that can adjust timings of optical signals transmitted from the optical multiplexing devices, by increasing a pulse width of the optical signals at the optical level (in the present embodiment, an optical demultiplexing device is explained as the optical signal demultiplexing device).

Figure 2:
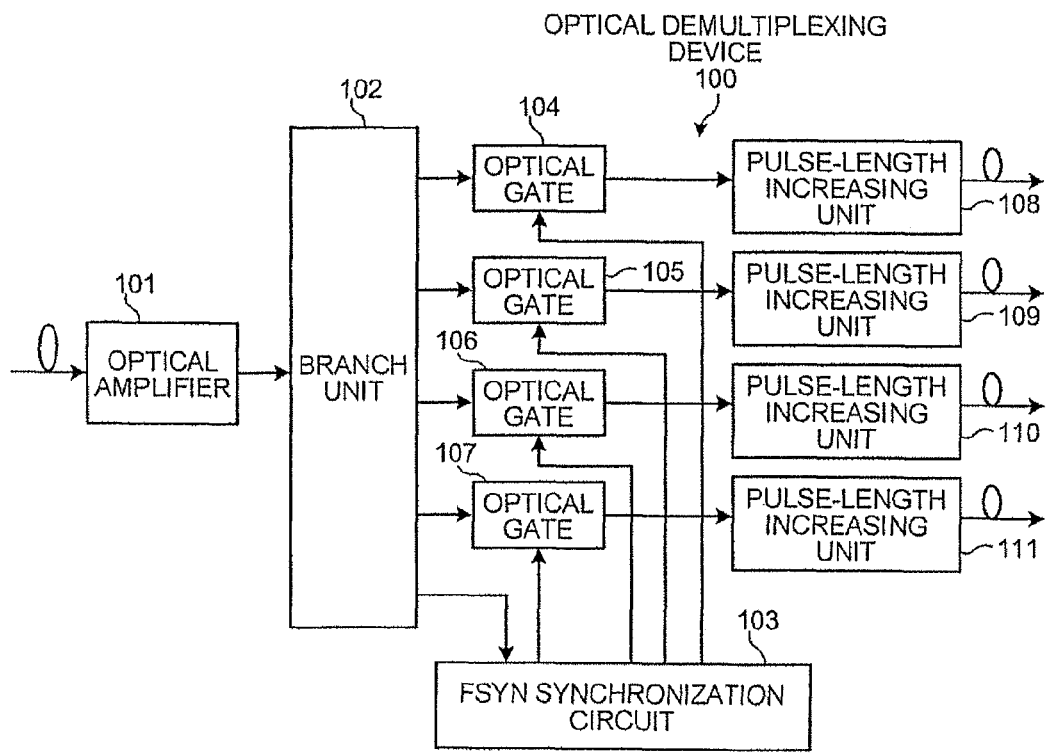
FIG. 2 is a functional block diagram of a configuration of an optical demultiplexing device according to a first embodiment.

FIG. 2 is a functional block diagram of a configuration of an optical demultiplexing device according to a first embodiment. As shown in FIG. 2, this optical demultiplexing device 100 includes an optical amplifier 101, a branch unit 102, an FSYN synchronization circuit 103, optical gates 104 to 107, and a pulse-length increasing unit 108. The optical amplifier 101, the branch unit 102, the FSYN synchronization circuit 103, and the optical gates 104 to 107 are similar to the optical amplifier 71, the branch unit 72, the FSYN synchronization circuit 73, and the optical gates 74 to 77, respectively, and therefore explanations thereof will be omitted.

Pulse-length increasing units 108 to 111 are processing units that increase pulse widths of the optical signals input from the optical gates 104 to 107. The pulse-length increasing units 108 to 111 have similar configurations. Therefore, the pulse-length increasing unit 108 is explained as an example, and the explanation of the pulse-length increasing units 109 to 111 is omitted.

Figure 3:
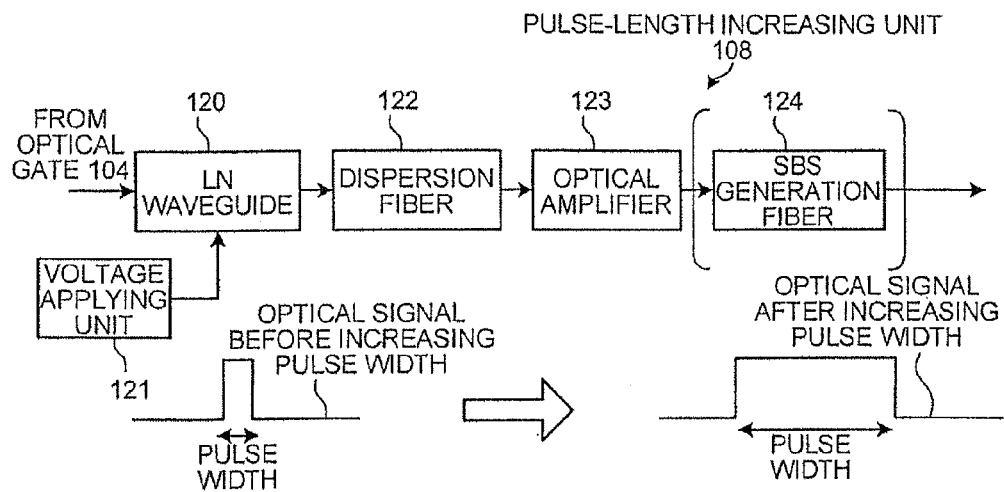
FIG. 3 is a functional block diagram of a configuration of a pulse-length increasing unit.

FIG. 3 is a functional block diagram of a configuration of a pulse-length increasing unit. As shown in FIG. 3, the pulse-length increasing unit 108 includes an LN waveguide 120, a voltage applying unit 121, a dispersion fiber 122, an optical amplifier 123, and an SBS generating fiber 124.

The LN waveguide 120 includes characteristics of LN (lithium niobate <LiNbO$_3$>). Specifically, when the voltage applying unit 121 (cyclically) applies a voltage to the LN waveguide 120, a refractive index of the LN waveguide 120 changes, and the LN waveguide 120 makes the optical signal passing through the LN waveguide 120 generate chirp. The chirp is a phenomenon that an optical frequency varies with time inside the pulse of the optical signal.

The dispersion fiber 122 increases the pulse width of the optical signal that generates the chirp. That is, the optical signal that is made to generate the chirp by the LN waveguide 120 has an increased pulse width when the optical signal passes through the dispersion fiber 122. The optical amplifier 123 is a processing unit that amplifies the optical signal passing through the dispersion fiber 122.

The SBS generation fiber 124 generates SBS (Stimulated Brillouin Scattering) and the like, and flattens the optical signal input from the optical amplifier 123. The pulse width of the optical signal input from the optical gate 104 is increased by passing through the LN waveguide 120, the dispersion fiber 122, the optical amplifier 123, and the SBS generation fiber 124.

As explained above, the pulse-length increasing units 108 to 111 can increase, in the state of light, the pulse widths of the optical signals input from the optical gates 104 to 107. Therefore, the timings of the optical signals can be easily adjusted in the state of light. In the network configuration shown in FIG. 1, the optical demultiplexing device 100 (the optical demultiplexing device 100 is used in place of the optical demultiplexing devices 70a and 70b) can demultiplex the optical signals input from the respective optical multiplexing devices, and the optical multiplexing device can OTDM multiplexes the optical signals again.

Figure 4:
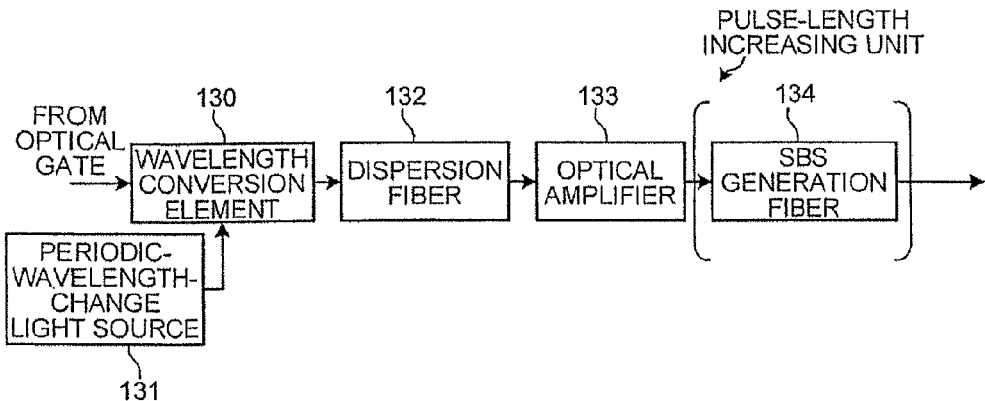
FIG. 4 is a functional block diagram (1) of a configuration of a pulse-length increasing unit using a wavelength conversion element.
Figure 5:
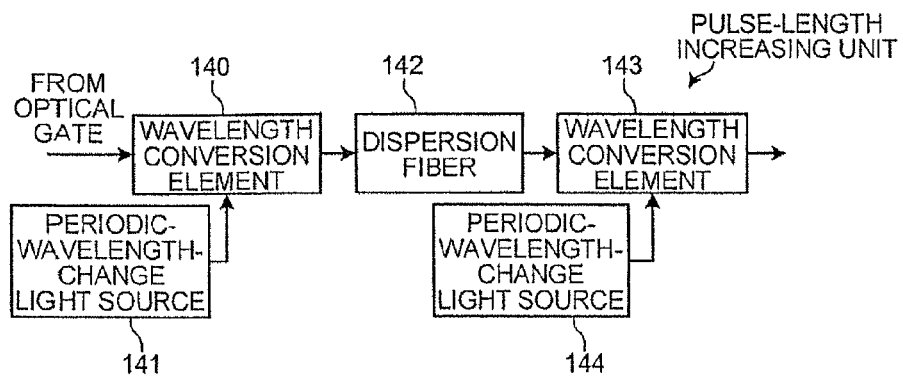
FIG. 5 is a functional block diagram (2) of a configuration of the pulse-length increasing unit using the wavelength conversion element.

As means for generating chirp, while the pulse-length increasing unit having the configuration shown in FIG. 3 is most practical, the chirp can be also generated using a wavelength conversion element, for example. FIG. 4 and FIG. 5 are functional block diagrams of configurations of a pulse-length increasing unit using the wavelength conversion element.

The pulse-length increasing unit shown in FIG. 4 includes a wavelength conversion element 130, a periodic-wavelength-change light source 131, a dispersion fiber 132, an optical amplifier 133, and an SBS generation fiber 134. The dispersion fiber 132, the optical amplifier 133, and the SBS generation fiber 134 are similar to the dispersion fiber 122, the optical amplifier 123, and the SBS generation fiber 124 explained with reference to FIG. 3, respectively, and therefore explanations thereof will be omitted.

The wavelength conversion element 130 positively uses a gain variation that becomes the cause of the pattern effect, and converts the wavelength of the input optical signal. By inputting the optical signal from the optical gate and inputting light (light of which wavelength changes periodically) from the periodic-wavelength-change light source 131, the wavelength of the optical signal input from the optical gate is periodically converted, thereby generating chirp.

The optical signal that generates chirp based on the operation of the wavelength conversion element 130 passes through the dispersion fiber 132, the optical amplifier 133, and the SBS generation fiber, thereby increasing the pulse width.

The pulse-length increasing unit shown in FIG. 5 includes wavelength conversion elements 140 and 143, periodic-wavelength-change light sources 141 and 144, and a dispersion fiber 142. The wavelength conversion elements 140 and 143, the periodic-wavelength-change light sources 141 and 144, and the dispersion fiber 142 are similar to the wavelength conversion element 130, the periodic-wavelength-change light source 131, and the dispersion fiber 132 shown in FIG. 4, respectively.

The pulse-width increasing unit shown in FIG. 5 can increase the pulse width of the optical signal input from the optical gate, by repeating at two times the wavelength conversion, using the wavelength conversion elements 140 and 143.

Figure 6:
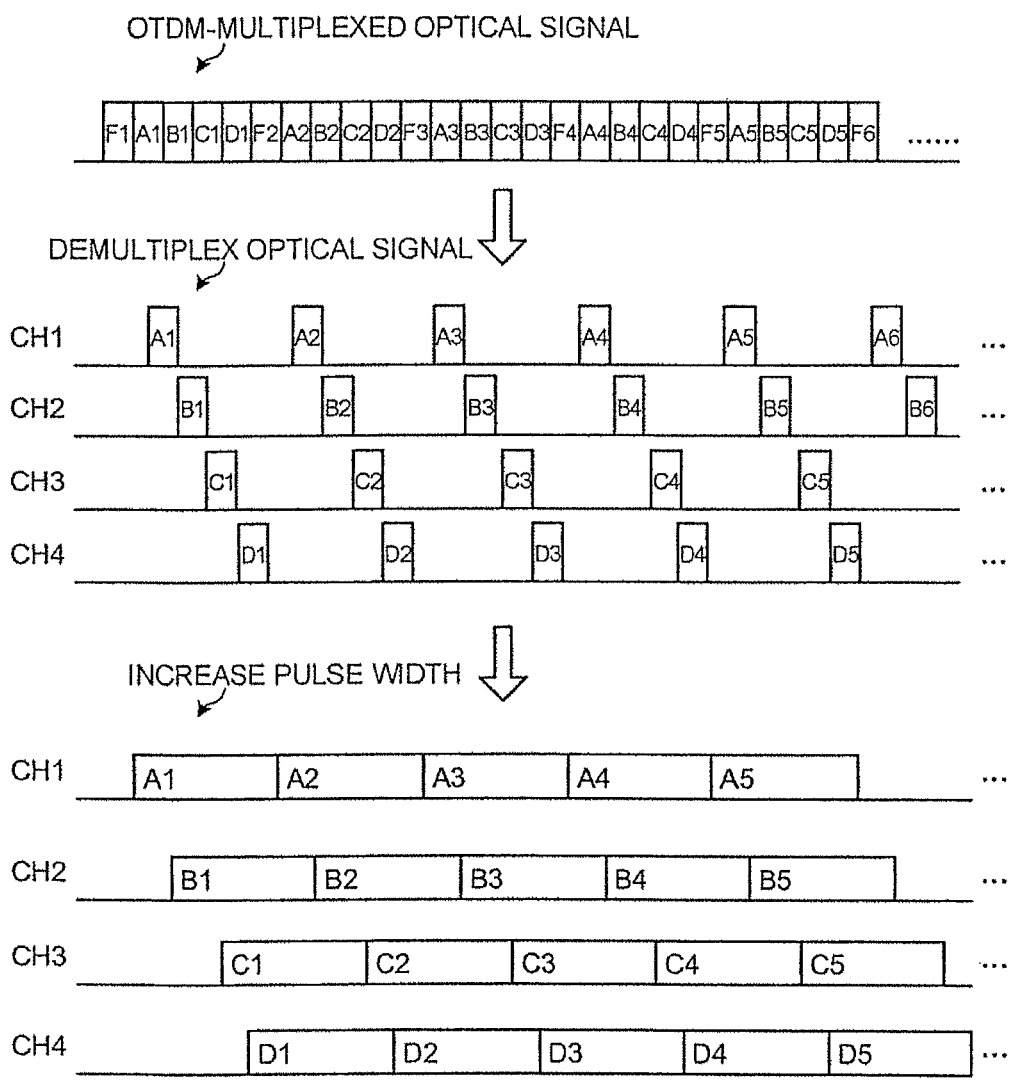
FIG. 6 is a time chart of a state that an OTDM-multiplexed optical signal is demultiplexed by an optical demultiplexing device.

A state of the optical signal when the OTDM-multiplexed optical signal is input to the optical demultiplexing device 100 is explained. FIG. 6 is a time chart of a state that the OTDM-multiplexed optical signal is demultiplexed by the optical demultiplexing device. As shown in FIG. 6, the optical gates 104 to 107 (the optical gates 104 to 107 correspond to CH1 to CH4, respectively) demultiplex the OTDM-multiplexed optical signal, and the pulse-length increasing units 108 to 111 increase the demultiplexed optical signals.

As described above, in the optical demultiplexing device 100 according to the first embodiment, the optical amplifier 101 amplifies the optical signal multiplexed by the optical multiplexing device, and the branch unit 102 branches the amplified optical signal, and inputs the branched optical signals to the optical gates 104 to 107 and the FSYN synchronization circuit 103. The FSYN synchronization circuit 103 changes over between the optical gates 104 to 107, based on the synchronization fixed pattern contained in the optical signal, and demultiplexes the multiplexed optical signal. The pulse-length increasing units 108 to 111 increase the pulse widths of the demultiplexed optical signals. Therefore, the timings of the optical signals can be easily adjusted in the state of light, and the optical signals demultiplexed by the optical demultiplexing device 100 can be OTDM multiplexed again.

Next, characteristics of an optical demultiplexing device according to a second embodiment are explained. The optical demultiplexing device 100 according to the first embodiment increases the pulse widths of the optical signals using the pulse-length increasing units 108 to 111, after the optical signal is branched. On the other hand, in the second embodiment, the pulse widths of the optical signals are collectively increased.

Because the pulse widths of the optical signals are collectively increased in the second embodiment, parts necessary for the optical demultiplexing device can be economized. At the same time, by using the optical demultiplexing device according to the second embodiment, timings of the optical signals can be adjusted in the state of light, like in the first embodiment, and a high-level process of the electric signal level can be executed.

Figure 7:
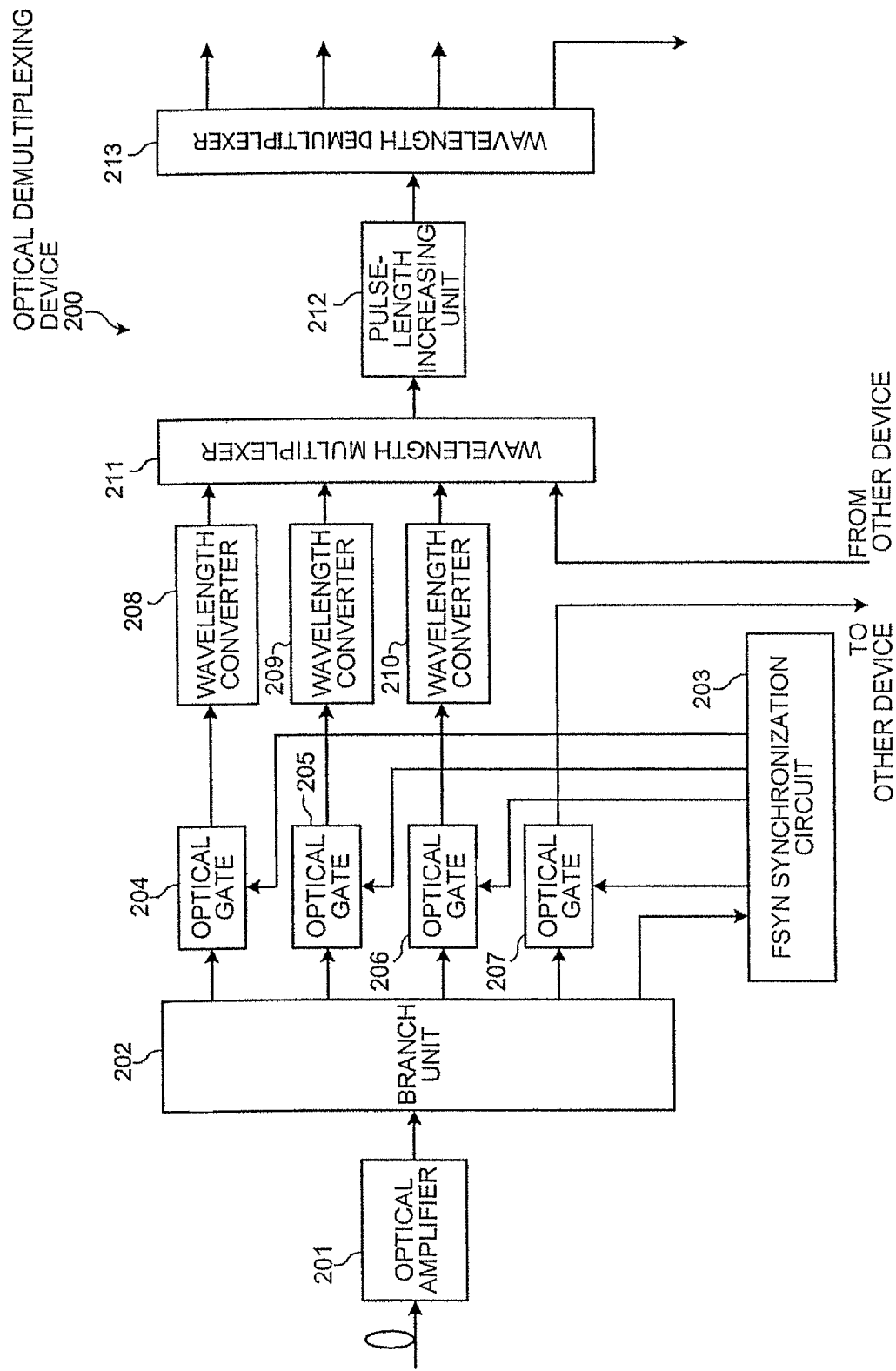
FIG. 7 is a functional block diagram of a configuration of an optical demultiplexing device according to a second embodiment.

Next, a configuration of the optical demultiplexing device according to the second embodiment is explained. FIG. 7 is a functional block diagram of the configuration of the optical demultiplexing device according to the second embodiment. As shown in FIG. 7, this optical demultiplexing device 200 includes an optical amplifier 201, a branch unit 202, an FSYN synchronization circuit 203, optical gates 204 to 207, wavelength converting units 208 to 210, a wavelength multiplexer 211, a pulse-length increasing unit 212, and a wavelength demultiplexer 213.

The optical amplifier 201, the branch unit 202, the FSYN synchronization circuit 203, and the optical gates 204 to 207 are similar to the optical amplifier 101, the branch unit 102, the FSYN synchronization circuit 103, and the optical gates 104 to 107, respectively, and therefore explanations thereof will be omitted. An optical signal output from the optical gate 207 shown in FIG. 6 is transmitted to other device (not shown), and an optical signal from other device is input to the wavelength multiplexer 211.

The wavelength converting units 208 to 210 are processing units that generate chirp in the optical signals. The wavelength converting units 208 to 210 include the LN waveguide 120 and the voltage applying unit 121 shown in FIG. 3, for example. That is, the LN waveguide 120 is periodically applied with a voltage by the voltage applying unit 121, and a refractive index of the LN waveguide 120 changes. The wavelength converting units 208 to 210 make the optical signals passing through this LN waveguide 120 generate chirp.

The wavelength multiplexer 211 is a processing unit that multiplexes the optical signals (optical signals generating the chirp) input from the wavelength converting units 208 to 210. This wavelength multiplexer 211 delivers the multiplexed optical signal to the pulse-length increasing unit 212.

The pulse-length increasing unit 212 is a processing unit that increases the pulse width of the optical signal input from the wavelength multiplexer 211. This pulse-length increasing unit 212 includes the dispersion fiber 122, the optical amplifier 123, and the SBS generation fiber 124 shown in FIG. 3, for example. That is, the dispersion fiber 122 increases the pulse width of the optical signal that generates chirp. The optical amplifier 123 amplifies the optical signal. The SBS generation fiber 124 adjusts the waveform of the optical signal of which pulse width is increased. This pulse-length increasing unit 212 can increase the pulse widths of the optical signals in the state of the multiplexed optical signals.

The wavelength demultiplexer 213 is a processing unit that demultiplexes the multiplexed optical signal (the pulse width of the optical signal is increased) input by the pulse-length increasing unit 212. The optical signals demultiplexed by the wavelength demultiplexer 213 are transmitted to the optical multiplexing devices 60c and 60d shown in FIG. 1, and are OTDM multiplexed again in the state of light.

As described above, in the optical demultiplexing device 200 according to the second embodiment, the optical amplifier 201 amplifies the optical signal multiplexed by the optical multiplexing device, and the branch unit 202 branches the amplified optical signal, and inputs the branched optical signals to the optical gates 204 to 207 and the FSYN synchronization circuit 203. The optical signals from the optical gates 204 to 206 are input to the wavelength converting units 208 to 210. The wavelength converting units 208 to 210 make the optical signals generate chirp. The wavelength multiplexer 211 multiplexes each optical signal. The pulse-length increasing unit 212 collectively increases the pulse width of the multiplexed optical signal, and the wavelength demultiplexer 213 demultiplexes the multiplexed optical signal. Therefore, the timings of the optical signals can be easily adjusted at low cost, and the demultiplexed optical signals can be OTDM multiplexed again in the state of light.

Next, characteristics of an optical demultiplexing device according to a third embodiment are explained. In demultiplexing the OTDM-multiplexed optical signal, signal synchronization for demultiplexing an optical signal from an ultrafast optical signal needs to be extracted. However, the currently available electric circuit has a slower response speed than that of the optical signal, and is very hard to extract the signal synchronization of the OTDM-multiplexed optical signal.

Therefore, the optical demultiplexing device according to the third embodiment converts the optical signal into an electric signal, by increasing the pulse width of the OTDM-multiplexed optical signal, and extracts the signal synchronization for demultiplexing the OTDM-multiplexed optical signal from the electric signal obtained by the conversion. Because the optical signal is converted into the electric signal by increasing the pulse width, even the currently available device (the electric circuit) having a slow response speed can extract in high precision the signal synchronization for demultiplexing the OTDM signal.

Figure 8:
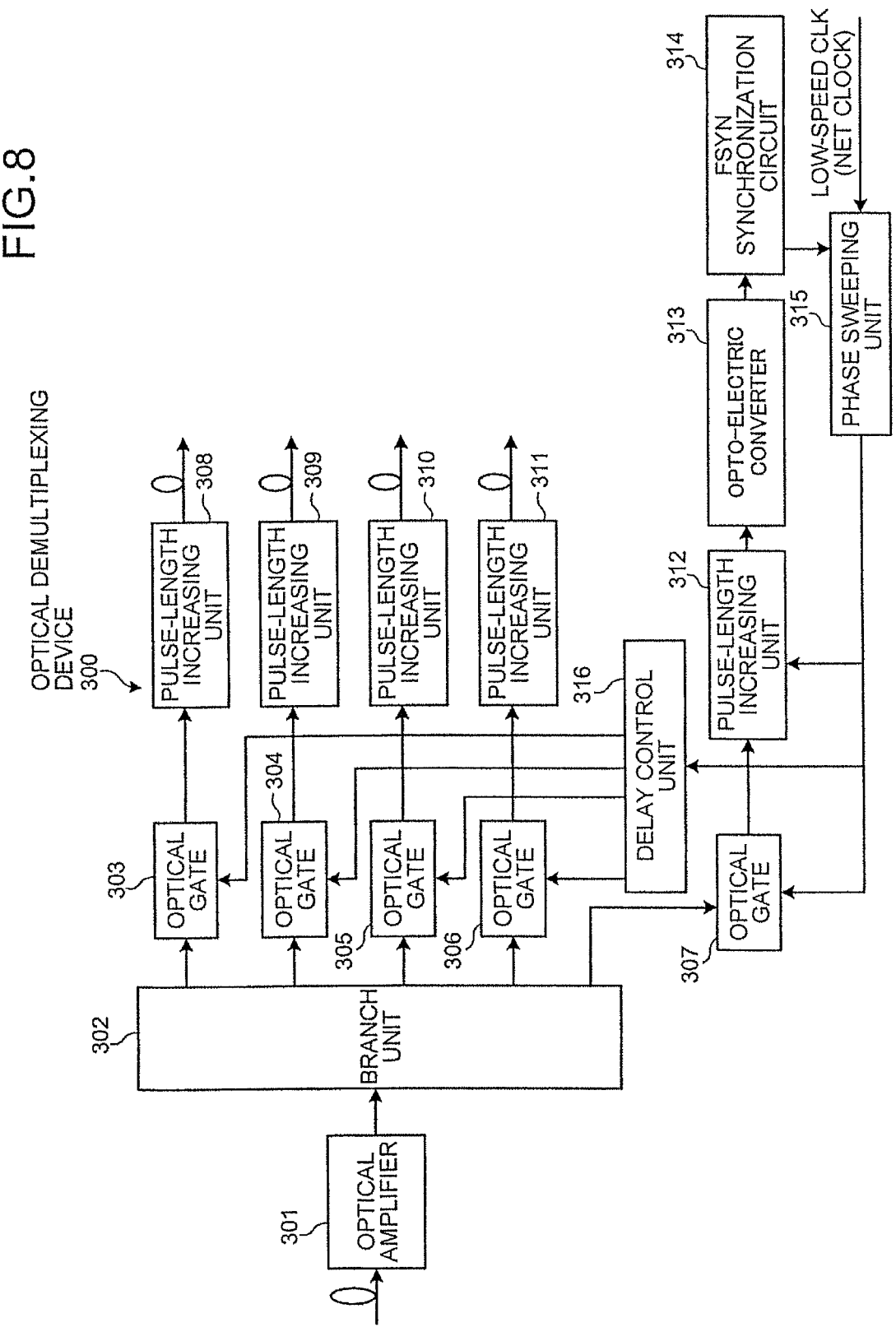
FIG. 8 is a functional block diagram of a configuration of an optical demultiplexing device according to a third embodiment.

A configuration of an optical demultiplexing device 300 according to the third embodiment is explained next. FIG. 8 is a functional block diagram of the configuration of the optical demultiplexing device according to the third embodiment. As shown in FIG. 8, this optical demultiplexing device 300 includes an optical amplifier 301, a branch unit 302, optical gates 303 to 307, pulse-length increasing units 308 to 312, an opto-electric converter 313, an FSYN synchronization circuit 314, and a phase sweeping unit 315.

The optical amplifier 301, the branch unit 302, and the pulse-length increasing units 308 to 312 are similar to the optical amplifier 101, the branch unit 102, and the pulse-length increasing units 108 to 111 shown in FIG. 2, and therefore explanations thereof will be omitted. The optical gates 303 to 306 are devices that change over between on and off, following the instruction of a delay control unit 316, extracts a predetermined optical signal from the optical signal input from the branch unit 302, and input the extracted optical signal to the pulse-length increasing units 308 to 311. The optical gate 307 is a device that changes over between on and off, following the instruction of the phase sweeping unit 315, extracts a predetermined optical signal from the optical signal input from the optical branch unit 302, and inputs the extracted optical signal to the pulse-length increasing units 312.

The opto-electric converter 313 is a processing unit that converts the optical signal of which pulse width is increased by the pulse-length increasing unit 312, into an electric signal. The opto-electric converter 313 inputs the converted electric signal to the FSYN synchronization circuit 314.

The FSYN synchronization circuit 314 is a processing unit that extracts the signal synchronization of the overhead data contained in the electric signal obtained from the opto-electric converter 313, and delivers the extracted signal synchronization to the phase sweeping unit 315.

The phase sweeping unit 315 adjusts the timing of a low-speed clock (net clock) input from the outside so that the timing of the signal synchronization obtained from the FSYN synchronization circuit 314 coincides with the timing of the low-speed clock. The phase sweeping unit 315 inputs a clock that becomes the signal synchronization equivalent to that of the OTDM-multiplexed optical signal, to the delay control unit 316.

The delay control unit 316 is a processing unit that changes over between the optical gates 303 to 306 based on the clock input from the phase sweeping unit 315, thereby demultiplexing the OTDM-multiplexed optical signal. The demultiplexed optical signals are input to the pulse-length increasing units 308 and 311, and the pulse-length increasing units 308 and 311 increase the pulse widths.

As described above, in the optical demultiplexing device 300 according to the third embodiment, the pulse-length increasing unit 312 increases the pulse width of the optical signal, and the opto-electric converter converts the optical signal into the electric signal. The FSYN synchronization circuit 314 extracts the signal synchronization of the overhead data from the electric signal. The phase sweeping unit 315 adjusts the low-speed clock, based on the signal synchronization. The delay control unit 316 changes over between the optical gates 303 to 306, based on the clock adjusted by the phase sweeping unit 315. Therefore, even when an electric circuit having a slow response speed is used, the OTDM-multiplexed optical signal can be demultiplexed.

Next, characteristics of an optical demultiplexing device according to a fourth embodiment are explained. When the optical demultiplexing device according to the fourth embodiment receives an optical signal that is byte-interleaved multiplexed by an optical multiplexing device, the optical demultiplexing device demultiplexes the received optical signal in the state of light. The optical multiplexing device that executes the byte-interleaved multiplexing is explained first, and then the optical demultiplexing device according to the fourth embodiment is explained.

Figure 9:
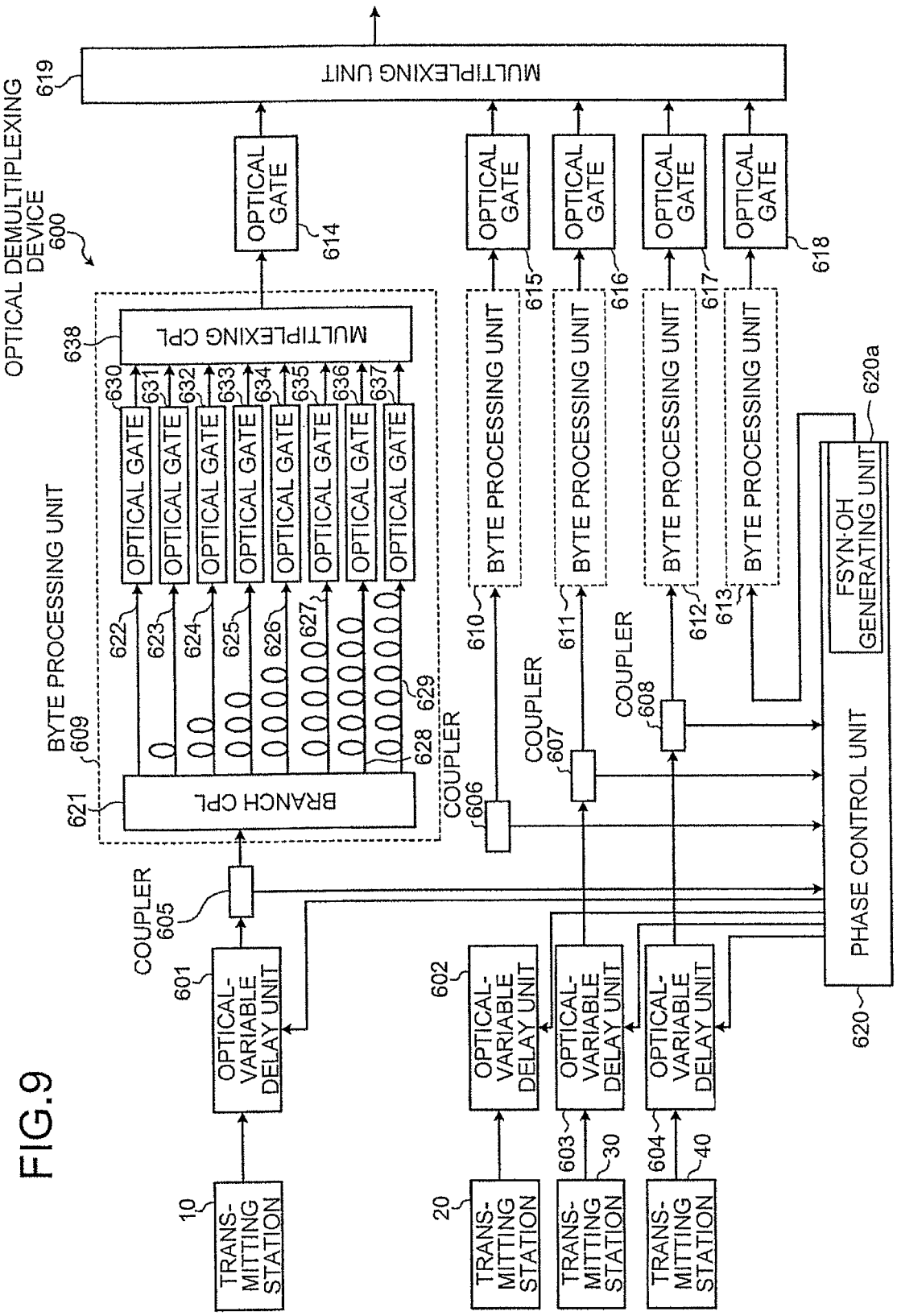
FIG. 9 is a functional block diagram of a configuration of an optical multiplexing device that executes a byte-interleaved multiplexing.

FIG. 9 is a functional block diagram of a configuration of an optical multiplexing device that executes a byte-interleaved multiplexing. As shown in FIG. 9, an optical demultiplexing device 600 includes optical-variable delay units 601 to 604, couplers 605 to 608, byte processing units 609 to 613, optical gates 614 to 618, a multiplexing unit 619, and a phase control unit 620. The couplers 605 to 608 are similar to the couplers 61 to 64 shown in FIG. 17, and therefore explanations thereof will be omitted.

The optical-variable delay units 601 to 604 are processing units that delay optical signals transmitted from the transmitting stations 10 to 40, based on control signals transmitted from the phase control unit 620. The byte processing units 609 to 613 execute byte-interleaved multiplexing to optical signals input from the couplers 605 to 608. The byte processing units 609 to 613 are similar to each other, and therefore, the byte processing unit is explained using the byte processing unit 609.

The byte processing unit 609 includes a branch CPL 621, waveguides 622 to 629, optical gates 630 to 637, and a multiplexing CPL 638. The branch CPL 621 is a device that branches the optical signal input from the coupler 605, and inputs the branched optical signals to the waveguides 622 to 629.

The waveguides 622 to 629 transmit optical signals to the optical gates 630 to 637. The waveguides 622 to 629 have mutually different lengths, and therefore, a delay difference occurs in the optical signals passing through the waveguides. In the example shown in FIG. 9, waveguides are long in the order of the waveguides 622, 623, . . . , 629. Therefore, the optical signal passing through the waveguide 622 first reaches the optical gate 630, and the optical signal passing through the waveguide 629 last reaches the optical gate 637.

The optical gates 630 to 637 are devices that perform on and off, following control signals from a control unit (not shown), and extract optical signals from the waveguides 622 to 629 at a predetermined timing. The optical signals output from the optical gates 630 to 637 are input to the multiplexing CPL 638. The multiplexing CPL 638 is a device that combines the optical signals output from the optical gates 630 to 637, and inputs the combined optical signal to the optical gate 614.

The optical gates 614 to 618 are devices that execute on and off, following a control signal from the phase control unit 620, and extract optical signals from the byte processing units 609 to 613 at a predetermined timing. The multiplexing unit 619 is a device that combines optical signals input from the optical gates 614 to 618, and outputs the combined optical signal to the optical demultiplexing device (according to the fourth embodiment).

The phase control unit 620 is a processing unit that controls change over between the optical gates 614 to 618, controls the optical-variable delay units 601 to 604, and adjusts the delay amount of the optical signals output from the optical-variable delay units 601 to 604. The phase control unit 620 includes an FSYN.OH generating unit 620a. This FSYN.OH generating unit 620a is a processing unit that generates overhead data, and inputs the generated overhead data to the byte processing unit 613.

Figure 10:
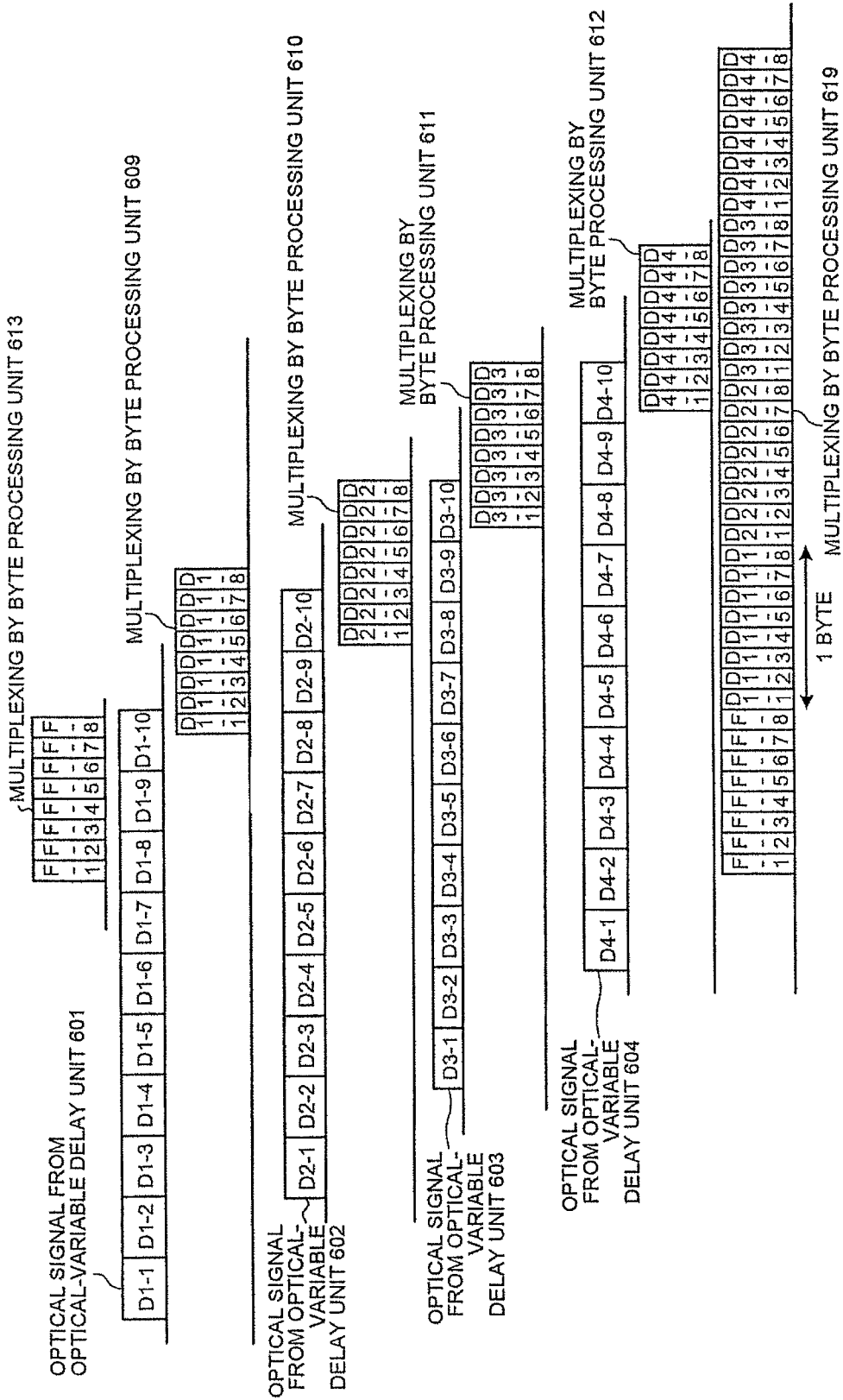
FIG. 10 is a time chart concerning an optical signal of the optical multiplexing device shown in FIG. 9.

FIG. 10 is a time chart concerning an optical signal of the optical demultiplexing device shown in FIG. 9. The byte processing units 609 to 613 execute the byte-interleaved multiplexing to the optical signals output from the optical-variable delay units 601 to 604, respectively. The byte processing unit 613 executes the byte-interleaved multiplexing to the overhead data generated by the FSYN.OH generating unit 620a. The optical signals multiplexed by the byte processing units 609 to 613 are input to the multiplexing unit 619, and the multiplexing unit 619 combines the multiplexed optical signals.

Figure 11:
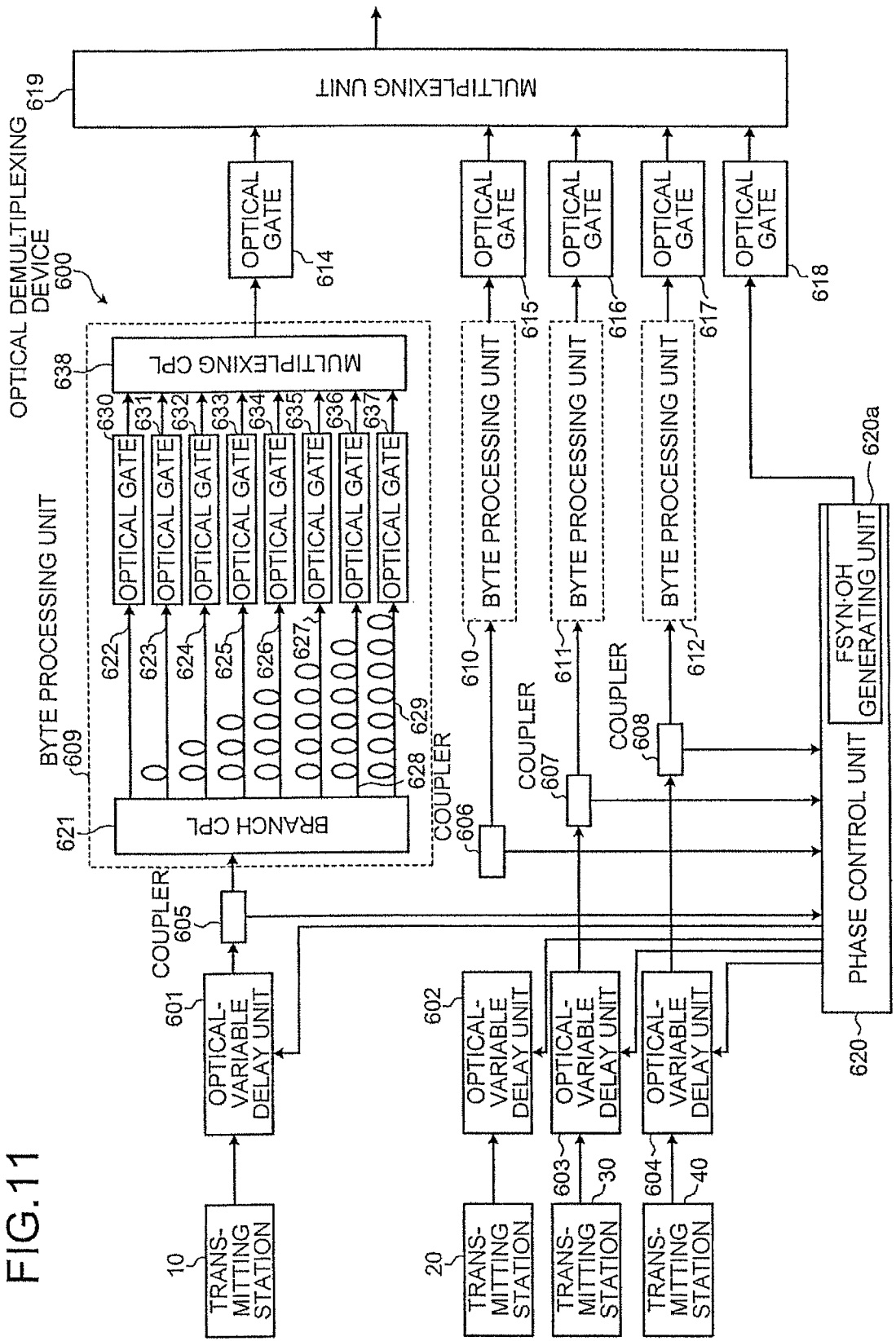
FIG. 11 is a functional block diagram of a configuration of an optical signal device that multiplexes overhead data with a low-speed signal.

In the optical demultiplexing device 600 shown in FIG. 9, the byte processing unit 413 multiplexes the overhead data generated by the FSYN.OH generating unit 620a. Alternately, as shown in FIG. 11, the overhead data can be directly input to the optical gate 618, and the overhead data can be multiplexed by the low-speed signal. By multiplexing the overhead signal by the low-speed signal as described above, the optical demultiplexing device that becomes the receiving side can easily extract the timings.

Figure 12:
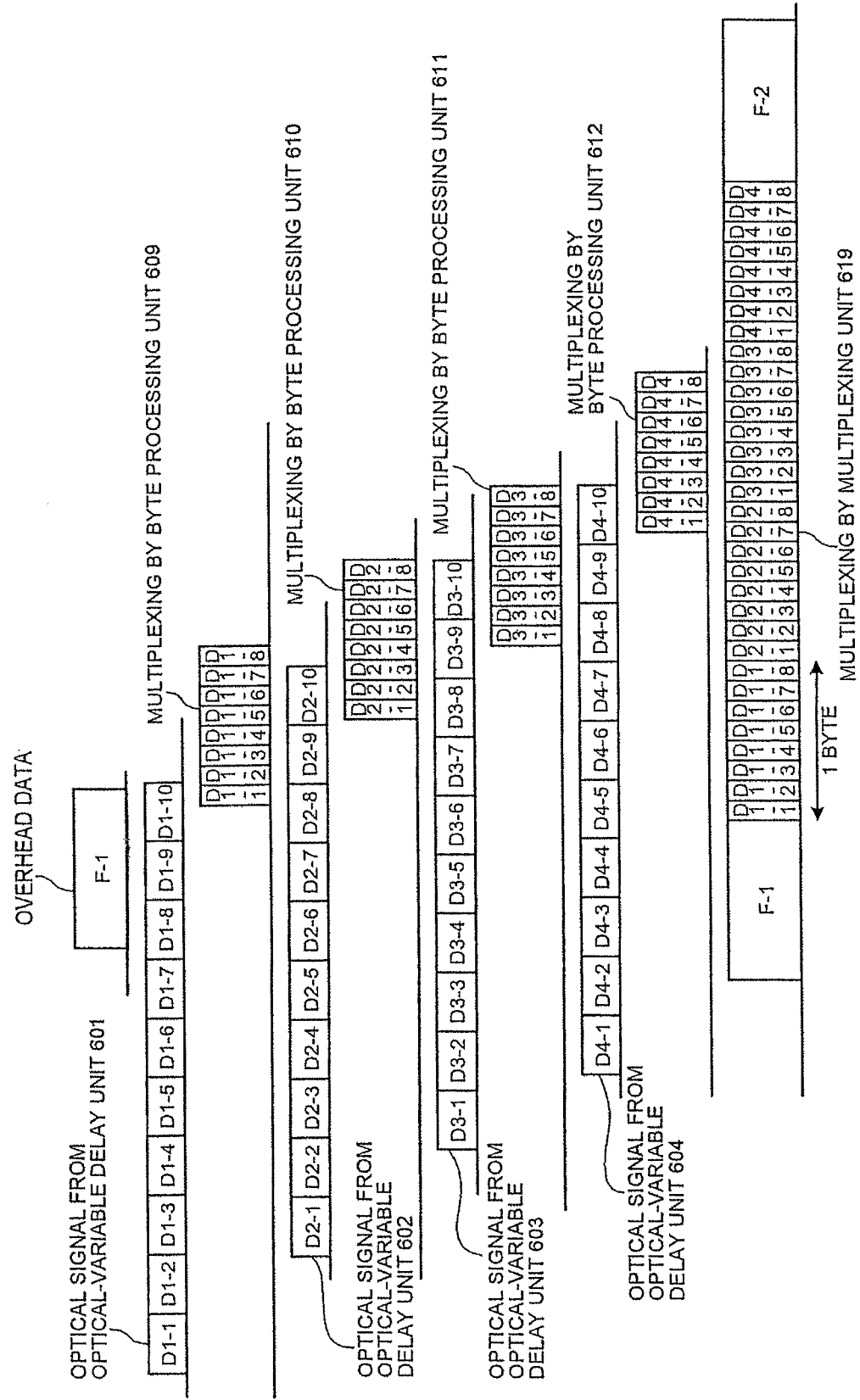
FIG. 12 is a time chart concerning an optical signal of the optical multiplexing device shown in FIG. 11.

FIG. 11 is a functional block diagram of a configuration of an optical signal device that multiplexes the overhead data by a low-speed signal. Configurations of units are similar to those of the optical multiplexing device 600 shown in FIG. 9, and therefore explanations thereof will be omitted. In FIG. 11, the overhead data output from the FSYN.OH generating unit 620a is not input to the byte processing unit, and is input to the optical gate 618. FIG. 12 is a time chart concerning the optical signal of the optical multiplexing device shown in FIG. 11. As shown in FIG. 12, the multiplexing unit 619 combines the overhead data by the low-speed signal.

Figure 13:
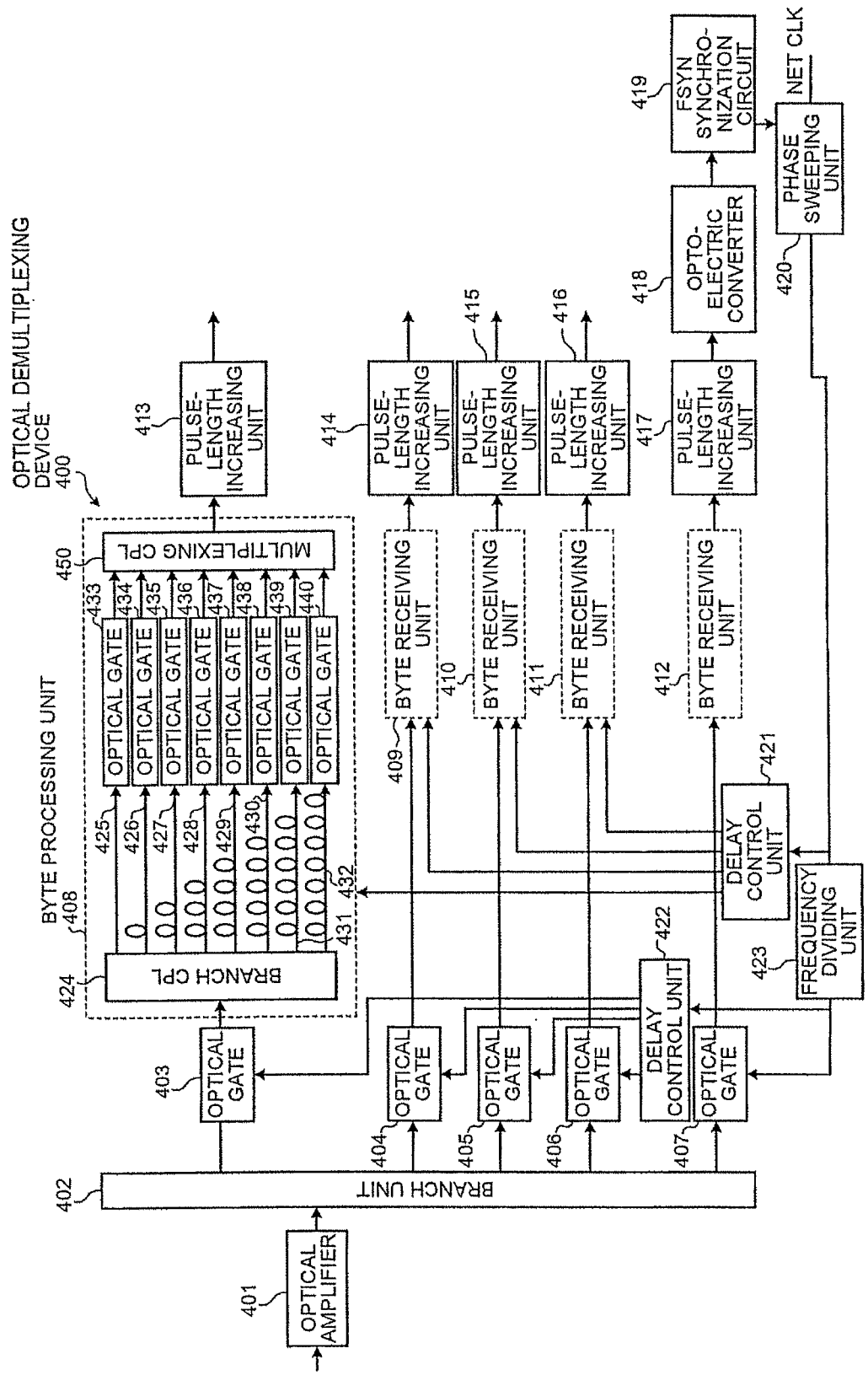
FIG. 13 is a functional block diagram (1) of a configuration of an optical demultiplexing device according to a fourth embodiment.
Figure 14:
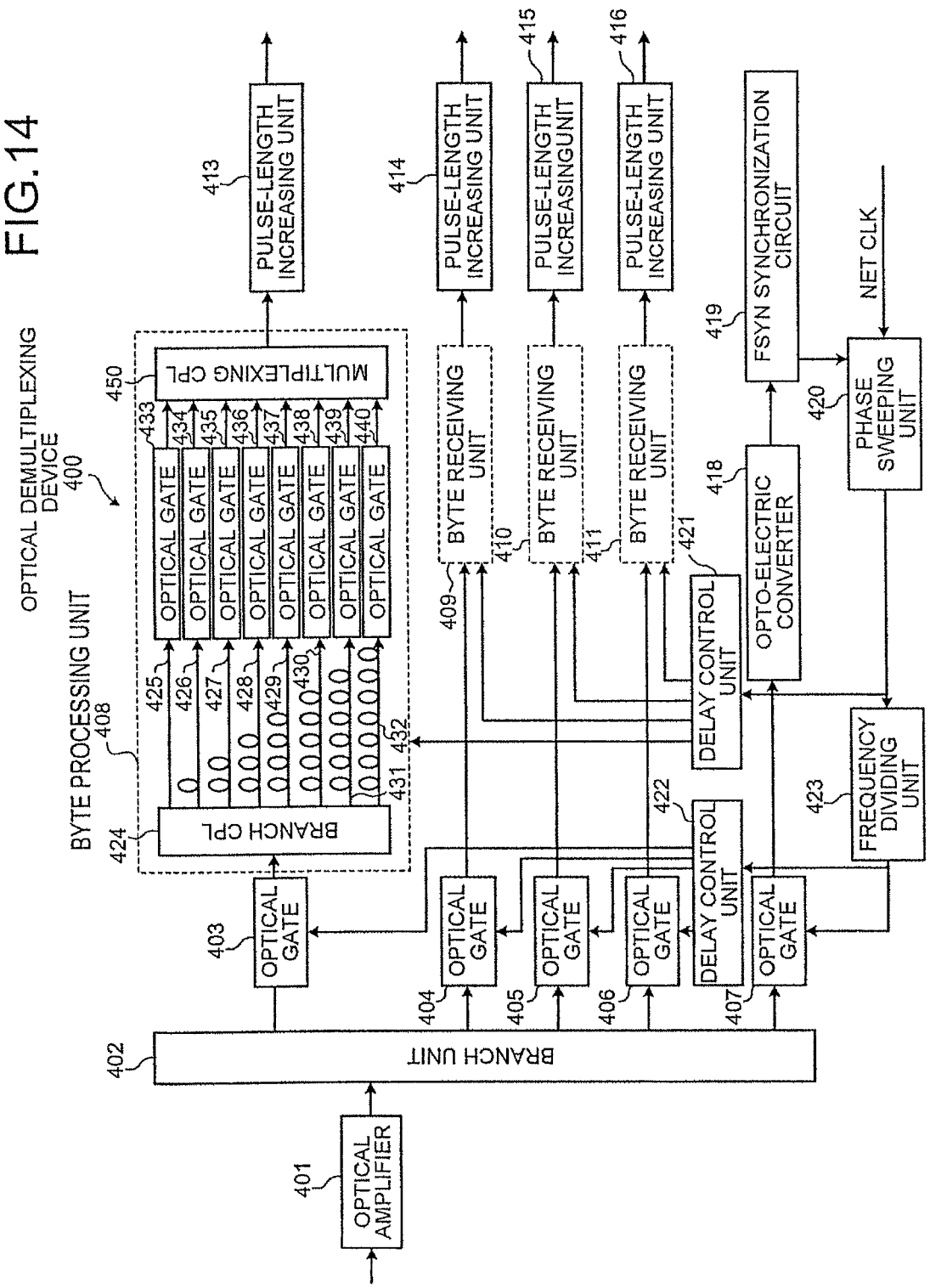
FIG. 14 is a functional block diagram (1) of a configuration of the optical demultiplexing device according to the fourth embodiment.

A configuration of an optical demultiplexing device according to the fourth embodiment is explained next. FIG. 13 and FIG. 14 are functional block diagrams of the configuration of the optical demultiplexing device according to the fourth embodiment. FIG. 13 is an optical demultiplexing device corresponding to the optical multiplexing device shown in FIG. 9, and FIG. 14 is an optical demultiplexing device corresponding to the optical demultiplexing device shown in FIG. 11. The configurations of the optical demultiplexing devices are explained below in the order of FIG. 13 and FIG. 14.

As shown in FIG. 14, this optical demultiplexing device 400 includes an optical amplifier 401, a branch unit 402, optical gates 403 to 407, byte receiving units 408 to 412, pulse-length increasing units 413 to 417, an opto-electric converter 418, an FSYN synchronization circuit 419, a phase sweeping unit 420, delay control units 421 and 422, and frequency dividing unit 423.

The optical amplifier 401, the branch unit 402, the optical gates 403 to 407, the pulse-length increasing units 413 to 417, the opto-electric converter 418, the FSYN synchronization circuit 419, the phase sweeping unit 420, and the delay control unit 422 are similar to the optical amplifier 301, the branch unit 302, the optical gates 303 to 307, the pulse-length increasing units 308 to 312, the opto-electric converter 313, the FSYN synchronization circuit 314, the phase sweeping unit 315, and the delay control unit 316, respectively shown in FIG. 8. Therefore, therefore explanations thereof will be omitted.

Figure 15:
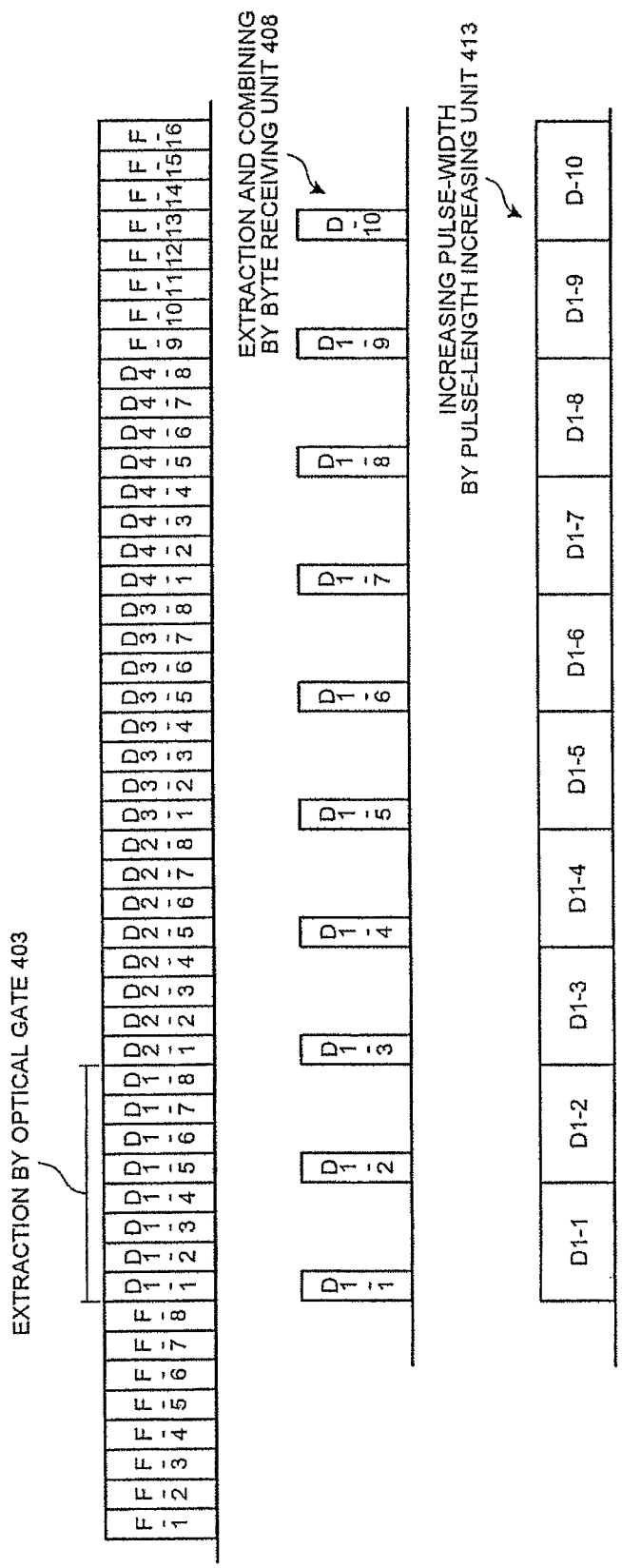
FIG. 15 is a time chart for supplementarily explaining a process of a byte processing unit.

The byte receiving units 408 to 412 are processing units that receive the optical signals from the optical gates 403 to 406, and extract and combine the received optical signals at each predetermined interval. The byte receiving units 408 to 412 are similar to each other, and therefore, the byte receiving unit is explained using the byte receiving unit 408. FIG. 15 is a time chart for supplementarily explaining a process of a byte receiving unit.

As shown in FIG. 15, the optical gate 403 extracts optical signals of D1-1 to D1-8, and the extracted optical signals are input to the byte receiving unit 408. The byte receiving unit 408 makes a branch CPL 424 branch the optical signals D1-1 to D1-8, and inputs the branched optical signals to waveguides 425 to 432.

The waveguides 425 to 432 transmit optical signals to optical gates 433 to 440. The waveguides 425 to 432 have mutually different lengths, and therefore, a delay difference occurs in the optical signals passing through the waveguides. In the example shown in FIG. 13, waveguides are long in the order of the waveguides 425, 426, . . . , 432. Therefore, the optical signal passing through the waveguide 425 first reaches the optical gate 440, and the optical signal passing through the waveguide 432 last reaches the optical gate 440.

The optical gates 433 to 440 are devices that perform on and off, following control signals from the delay control unit 421, and extract optical signals from the waveguides 425 to 432 at a predetermined timing. The optical signals output from the optical gates 433 to 440 are input to a multiplexing CPL 450. The multiplexing CPL 450 is a device that combines the optical signals output from the optical gates 433 to 440, and inputs the combined optical signal to the pulse-length increasing unit 413.

That is, when the optical signal shown in the upper part of FIG. 15 is input to the byte receiving unit 408, this optical signal becomes the optical signal shown in the middle of FIG. 15. When the optical signal from the byte receiving unit 408 is input to the pulse-length increasing unit 413, the pulse width of the optical signal is increased, and the optical signal becomes the one as shown in the lower part in FIG. 15.

The delay control unit 421 is a processing unit that changes over between the optical gates held by the byte receiving units 408 to 412 so that the optical gates are signal-synchronized with the clock input from the phase sweeping unit 420. The frequency dividing unit 423 is a processing unit that adjusts the clock frequency input from the phase sweeping unit 420 to a specific frequency.

As described above, in the optical demultiplexing device 400 shown in FIG. 13, the byte receiving units 408 to 412 extract the byte-interleaved multiplexed optical signals, and the pulse-length increasing units 413 to 416 increase the pulse widths of the extracted optical signals. Therefore, the byte-interleaved multiplexed optical signals can be demultiplexed in the state of light.

Next, the optical demultiplexing device that demultiplexes the optical signal obtained by multiplexing the overhead data by the low-speed signal is explained. Configurations of units are similar to those of the optical demultiplexing device 400 shown in FIG. 13, and therefore explanations thereof will be omitted. The optical demultiplexing device 400 shown in FIG. 14 is different from the optical demultiplexing device shown in FIG. 13 in that the optical demultiplexing device 400 does not include the byte receiving unit 412 and the pulse-length increasing unit 417.

Figure 16:
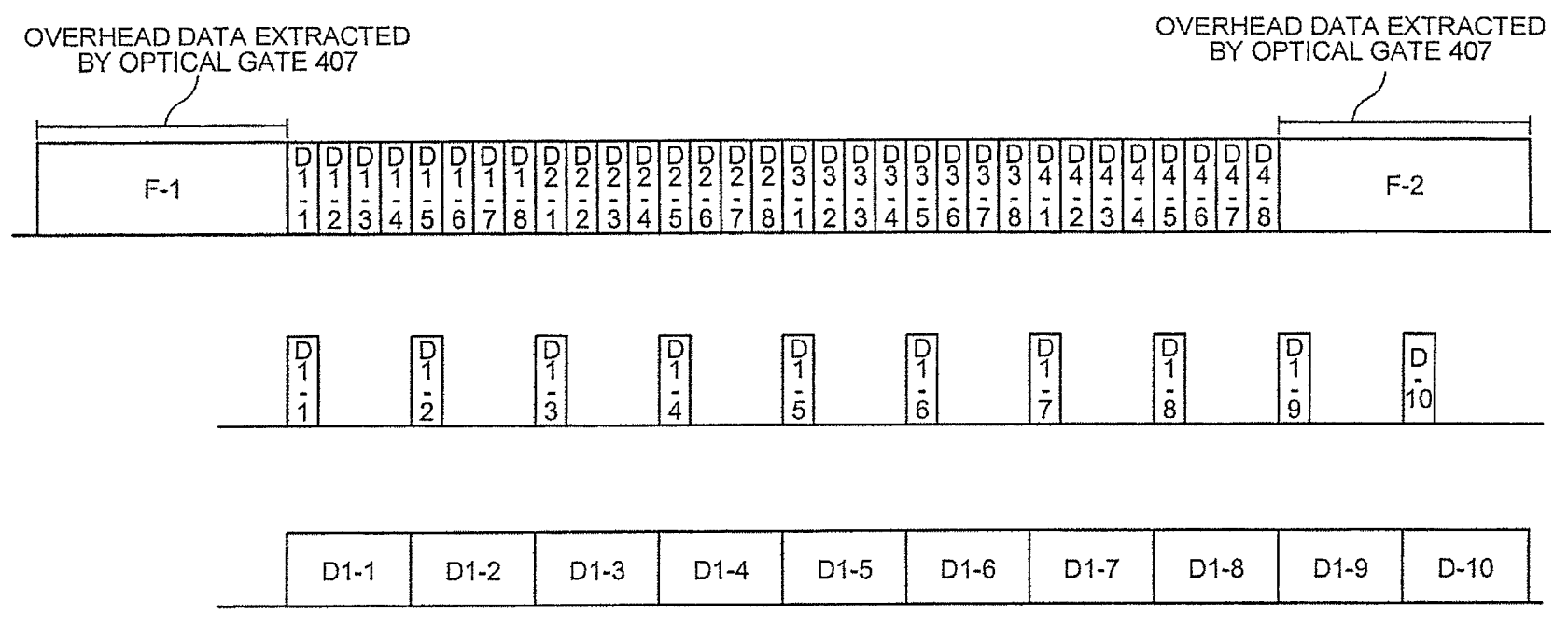

FIG. 16 is a time chart concerning the optical signal that the optical demultiplexing device shown in FIG. 14 receives. The overhead data contained in the optical signal is multiplexed by the low-speed signal. Therefore, even when the opto-electric converter 418 having a slow response speed is used, a synchronization signal of the multiplexed optical signal can be extracted in high precision, and the multiplexed optical signal can be demultiplexed in the state of light.

The optical signal demultiplexing device according to the embodiments receive an optical signal multiplexed by an optical time-division system, extracts a synchronization pattern of this optical signal, demultiplexes the optical signal based on the extracted synchronization pattern, makes the demultiplexed optical signal generate chirp, and passes the optical signal generating the chirp through a wavelength dispersion medium, thereby increasing a pulse width of the optical signal. Therefore, the optical signal can be adjusted in the state of light, and a high-level process of an electric signal level can be executed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:
1. An optical signal demultiplexing device comprising:
a first demultiplexer that receives an optical signal multiplexed by an optical time-division system and a synchronization pattern, and demultiplexes the optical signal based on the synchronization pattern;
a plurality of wavelength converters each of which applies chirp to each of demultiplexed optical signals obtained by the first demultiplexer;
a multiplexer that multiplexes optical signals obtained by the plurality of wavelength converters;
a pulse-width increasing unit that collectively passes the optical signals multiplexed by the multiplexer, and increases the pulse widths of the optical signals by passing the optical signals through a wavelength dispersion medium; and
a second demultiplexer that demultiplexes the optical signals that pass through the wavelength dispersion medium,
wherein each of the plurality of wavelength converters passes the demultiplexed optical signal through a lithium niobate waveguide, and changes a refractive index of the lithium niobate waveguide, to generate the chirp in the optical signals.

2. An optical signal demultiplexing device comprising:
a first demultiplexer that receives an optical signal multiplexed by an optical time-division system and a synchronization pattern, and demultiplexes the optical signal based on the synchronization pattern;
a plurality of wavelength converters each of which applies chirp to each of demultiplexed optical signals obtained by the first demultiplexer;
a multiplexer that multiplexes optical signals obtained by the plurality of wavelength converters;
a pulse-width increasing unit that collectively passes the optical signals multiplexed by the multiplexer, and increases the pulse widths of the optical signals by passing the optical signals through a wavelength dispersion medium; and a second demultiplexer that demultiplexes the optical signals that pass through the wavelength dispersion medium, wherein the each of the plurality of wavelength converters generates the chirp in the optical signals in such a manner that the demultiplexed optical signals are passed through a wavelength conversion unit, the wavelength conversion unit is irradiated by light a wavelength of which is periodically changed and on which a wavelength conversion is to be performed to change a conversion amount of the wavelength concerning the optical signals.

3. An optical signal demultiplexing device comprising:

a first demultiplexer that receives an optical signal multiplexed by an optical time-division system and a synchronization pattern, and demultiplexes the optical signal based on the synchronization pattern;

a plurality of wavelength converters each of which applies chirp to each of demultiplexed optical signals obtained by the first demultiplexer;

a multiplexer that multiplexes optical signals obtained by the plurality of wavelength converters;

a pulse-width increasing unit that collectively passes the optical signals multiplexed by the multiplexer, and increases the pulse widths of the optical signals by passing the optical signals through a wavelength dispersion medium; and a second demultiplexer that demultiplexes the optical signals that pass through the wavelength dispersion medium, wherein the first demultiplexer includes:
   an electric-signal converter that increases the pulse width of the optical signal and converts the optical signal, whose pulse width is increased, into an electric signal, signal; and
   a demultiplexer that extracts the synchronization pattern of the multiplexed optical signal from the electric signal obtained by a conversion by the electric-signal converter, to demultiplex the optical signal based on the synchronization pattern.

4. An optical signal demultiplexing method comprising:

receiving an optical signal multiplexed by an optical time-division system and a synchronization pattern, and demultiplexing the optical signal based on the synchronization pattern;

passing the demultiplexed optical signals through each of a plurality of wavelength conversion elements to apply chirp to each of the demultiplexed optical signals;

multiplexing the optical signals obtained by the plurality of wavelength conversion elements;

increasing the pulse widths of the optical signals by passing the optical signals through a wavelength dispersion medium collectively; and demultiplexing the optical signals that pass through the wavelength dispersion medium, wherein the chirp is generated in the demultiplexed optical signals in such a manner that the demultiplexed optical signal is passed through a lithium niobate waveguide and a refractive index of the lithium niobate waveguide is changed.

5. An optical signal demultiplexing method comprising:

receiving an optical signal multiplexed by an optical time-division system and a synchronization pattern, and demultiplexing the optical signal based on the synchronization pattern;

passing the demultiplexed optical signals through each of a plurality of wavelength conversion elements to apply chirp to each of the demultiplexed optical signals;

multiplexing the optical signals obtained by the plurality of wavelength conversion elements;

increasing the pulse widths of the optical signals by passing the optical signals through a wavelength dispersion medium collectively; and demultiplexing the optical signals that pass through the wavelength dispersion medium, wherein the chirp is generated in the optical signals in such a manner that the demultiplexed optical signals are passed through a wavelength conversion element, the wavelength conversion element is irradiated by light a wavelength of which is periodically changed and on which a wavelength conversion is to be performed to change a conversion amount of the wavelength concerning the optical signals.

6. An optical signal demultiplexing method comprising:

receiving an optical signal multiplexed by an optical time-division system and a synchronization pattern, and demultiplexing the optical signal based on the synchronization pattern;

passing the demultiplexed optical signals through each of a plurality of wavelength conversion elements to apply chirp to each of the demultiplexed optical signals;

multiplexing the optical signals obtained by the plurality of wavelength conversion elements;

increasing the pulse widths of the optical signals by passing the optical signals through a wavelength dispersion medium collectively; and demultiplexing the optical signals that pass through the wavelength dispersion medium, wherein the receiving includes:
   increasing the pulse width of the optical signal and converting the optical signal, whose pulse width is increased, into an electric signal; and
   extracting the synchronization pattern of the optical-division multiplexed optical signal from the electric signal.

* * * * *

UNITED STATES PATENT AND TRADEMARK OFFICE
CERTIFICATE OF CORRECTION

PATENT NO.           : 8,538,268 B2                                      Page 1 of 1
APPLICATION NO.      : 13/298911
DATED                : September 17, 2013
INVENTOR(S)          : Futoshi Izumi It is certified that error appears in the above-identified patent and that said Letters Patent is hereby corrected as shown below:

In the Claims:

In Column 13, Line 7, In Claim 2, after "wherein" delete "the".
In Column 13, Line 38, In Claim 3, before "signal;" delete "signal,".

Signed and Sealed this
Seventh Day of January, 2014

Margaret A. Focarino
*Commissioner for Patents of the United States Patent and Trademark Office*